W. G. TEMPLETON.
SCALE.
APPLICATION FILED OCT. 5, 1909.

1,257,547.

Patented Feb. 26, 1918.
3 SHEETS—SHEET 1.

Witnesses

Inventor
William G. Templeton.
By C. A. Snow & Co.
Attorneys

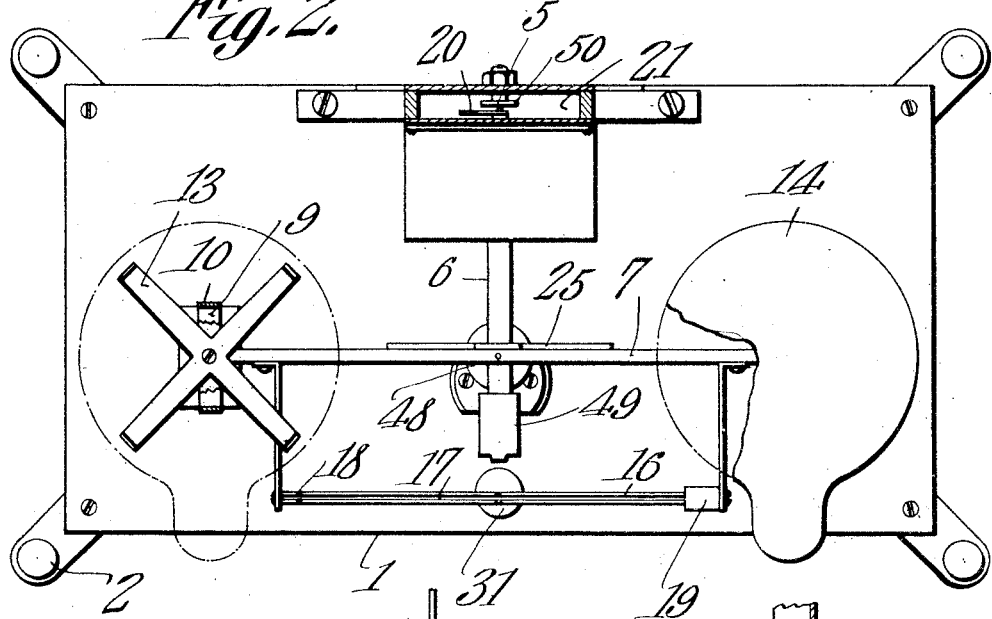
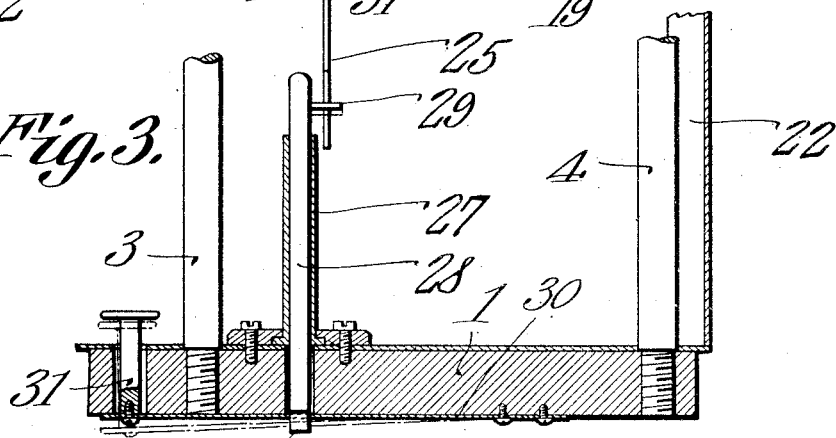
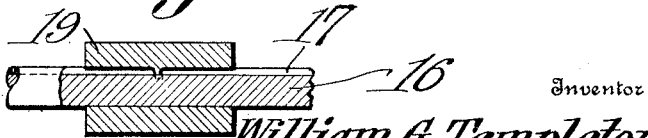

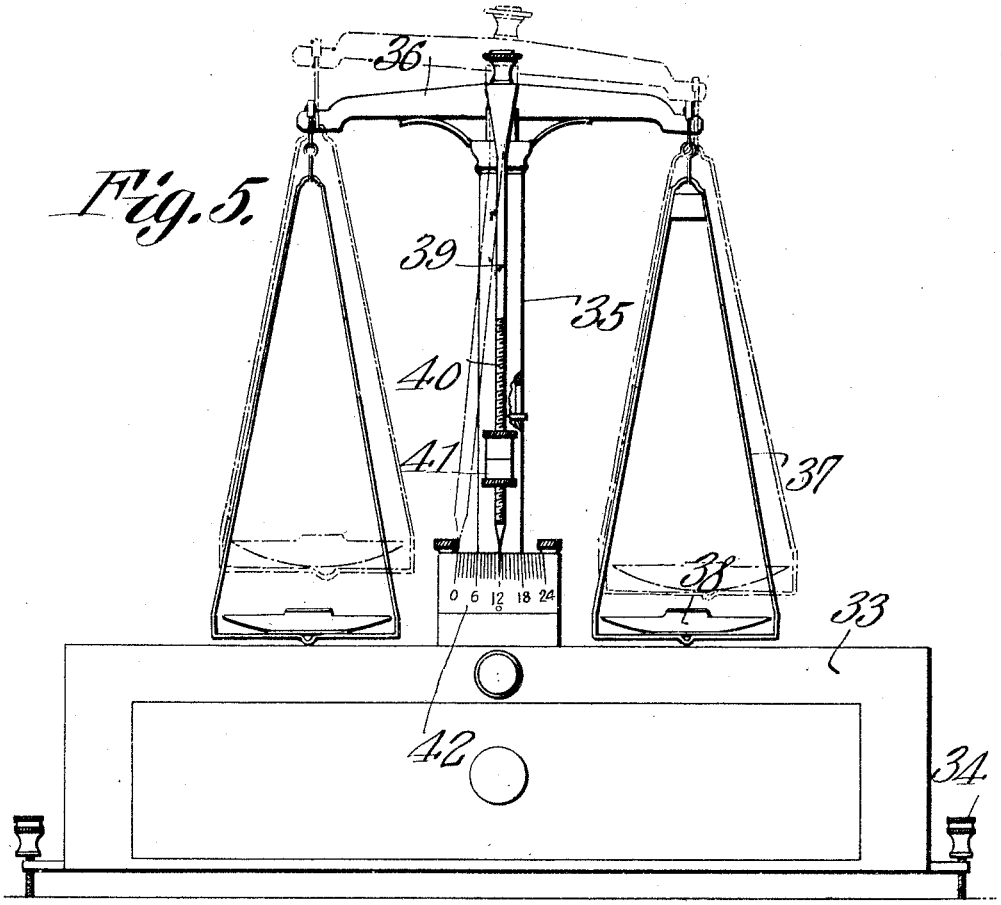

UNITED STATES PATENT OFFICE.

WILLIAM G. TEMPLETON, OF COLORADO SPRINGS, COLORADO, ASSIGNOR, BY MESNE ASSIGNMENTS, TO TOLEDO SCALE COMPANY, OF TOLEDO, OHIO, A CORPORATION OF NEW JERSEY.

SCALE.

1,257,547.  Specification of Letters Patent.  Patented Feb. 26, 1918.

Application filed October 5, 1909. Serial No. 521,030.

*To all whom it may concern:*

Be it known that I, WILLIAM G. TEMPLETON, a citizen of the United States, residing at Colorado Springs, in the county of El Paso and State of Colorado, have invented new and useful Scales, of which the following is a specification.

This invention has reference to improvements in weighing scales and its object is to provide a scale wherein fractions of a unit for which the scale is adjusted are distinctly displayed without the necessity of the operator handling weights representing such fractions of units.

Ordinarily the equilibrium position of scale beams, especially those used for delicate weights is the horizontal.

Scales used by assayers are usually provided with a delicately balanced beam having pendent pans and the beam is provided with an elongated pointer so arranged that the scale is in the balanced or zero position when the pointer is at the middle point of a suitable scale.

With such a weighing apparatus the operator must handle weights down to the smallest fraction for which the scale is designed.

Various units of weights are customarily employed in certain arts, as for instance the carat in weighing diamonds, the pennyweight in weighing precious metals, the scruple for chemicals and the gram for many different types of materials.

Usually smaller weights are designated by certain definite fractions of these units. For instance the fractional parts of the carat, pennyweight and scruple are represented in grains, while the fractions of the gram are represented in decigrams, centigrams, or milligrams. In the ordinary use of delicate scales the operator must oftentimes handle very small weights and even then has no means of ascertaining fractional parts of the latter unless supplied with still smaller weights which must therefore be handled.

To avoid the handling of small weights and yet give the scale a range sufficient to indicate the ordinary fractional parts of the unit weights and also sub-fractional parts thereof without the necessity of handling any weights except the comparatively large units when these must be used, a scale constructed in accordance with the present invention has the scale beam normally tipped to one extreme of its movement to represent the zero or balanced position, this being accomplished by overbalancing one side of the beam to the requisite extent. The pointer carried by the scale beam and the scale traversed by the pointer are so proportioned that the number of fractions into which the scale is divided extends to an equal distance on each side of the middle point of the scale which is the zero or balanced point of the usual form of scale.

So long as the movement of the scale beam from the position of horizontal equilibrium to either side of the zero position, is confined within comparatively narrow limits, the extent of movement of the scale beam will be the same for each equal addition of weight, the variation which theoretically takes place as the scale beam moves from the horizontal position being so infinitesimal within the narrow limits assumed as to be entirely negligible.

In a scale constructed in accordance with the present invention the normal or zero position of the scale beam is at an incline with the indicator at one end of the scale, which latter is so proportioned that the scale beam must move to a position as far beyond the horizontal in the other direction as its initial position is beyond the horizontal in the first direction in order that the pointer may traverse the whole scale, and this scale represents the ordinary fractional parts of the smaller weight unit or poise to be used, and when the pointer is of sufficient length, then the scale may represent sub-fractions of a unit poise, but in all cases the arc represented by the scale should be relatively small, so that the divisions of the scale may be equal and within the limits of practical accuracy.

The invention will be best understood from a consideration of the following detail description taken in connection with the accompanying drawings forming a part of this specification, in which drawings, Figure 1 is a front elevation with some parts broken away, of a scale embodying the present invention.

Fig. 2 is a plan view of the structure shown in Fig. 1 with some parts in section and some parts broken away.

Fig. 3 is a detail section showing the damping mechanism for arresting the vibration of the indicator needle.

Fig. 4 is a detail view of a slide which may be used in connection with the scale.

Fig. 5 is a front elevation of a pendent pair of weighing scales of known type with the invention applied.

Figs. 6 and 7 are detail views of portions of the structure of Fig. 5.

Figure 1:
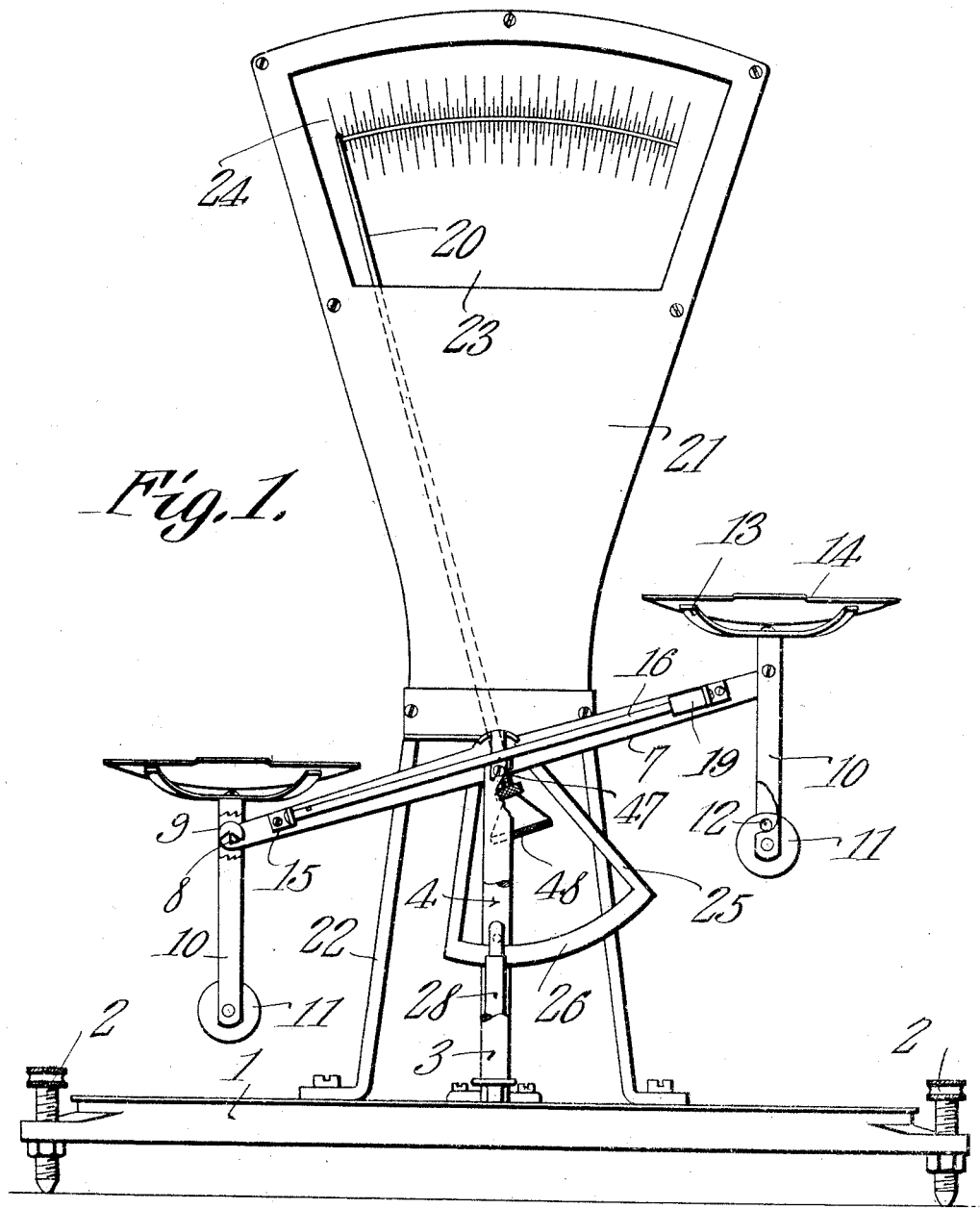

Referring first to Figs. 1 to 4 both inclusive there is shown a suitable base 1 which is to be taken as illustrative of any suitable base, and this base may be mounted upon the usual adjusting screws 2 commonly provided for leveling the scales.

Mounted on the base 1 are posts 3, 4, midway of the length of the base and spaced apart transversely thereof, one post being located near the front of the base and the other post near the rear of the base. These posts are formed at their upper ends with the usual seats for knife edge bearings 5 on the opposite ends of an arbor 6 designed to turn about an axis coincident with the edges of the said knife edge bearings where they are supported at the upper ends of the posts 3 and 4. This arbor has fast thereto a scale beam 7 extending to equal distances on opposite sides of the arbor, and while this scale beam is shown in the drawings as a simple straight bar, it will be understood that it may be otherwise formed if so desired.

The ends of the scale beam 7 carry laterally projecting knife edges 8 of usual construction receiving recessed blocks 9 of the type usually employed in connection with knife edge bearings in scales and these blocks are each mounted in a frame 10 of yoke shape straddling the scale beam with the yoke portion above the scale beam and the legs of the yoke extending down below the scale beam where they are united by a counter-weight 11. For the initial adjustment of the scale beam one or the other of the counter-weights 11 may be bored out as indicated at 12, so that the other counter-weight 11 will over-balance the bored out counter-weight and thus cause the scale beam to assume an inclined position with the heavier counter-weight lower than the lighter one. Accuracy of initial adjustment may be attained by the insertion of small weights in the bore 12 of the lighter weight 11.

Each yoke 10 has at its upper end pan-sustaining fingers 13 designed to receive the usual scale pan 14.

Fast on one side of the scale beam 7 are brackets 15 located on opposite sides of the axis of the scale beam and equidistant from said axis, and these brackets carry a rod 16 provided on the upper surface with a longitudinal groove 17 and cross notches 18. The rod 16 carries a sliding block 19 of predetermined weight adjustable along the rod 16 and adapted to lock temporarily in the notches 18. The scale beam 7 may be located near one end of the arbor 6 and near the other end of the arbor there is secured thereto a pointer 20 perpendicular to the scale beam 7 but radial to the axis of the arbor 6, so that with the arbor 6, the axis, the scale beam and pointer form a series of radial arms extending at angles of 90° with relation to each other. The pointer 20 may be housed within a suitable casing 21 preferably of segmental shape and in the drawings shown as supported upon a standard 22 erected on the base 1. In the particular structure shown the casing 21 is provided with an opening which may be closed by a transparent pane 23, and behind this pane the casing contains a suitable scale 24 in position to be traversed by the indicating end of the pointer 20.

The scale beam 7 carries a depending segmental frame 25 having a curved end 26, the inner edge of which describes an arc struck from the axis of the arbor 6.

Mounted on the base 1 is an upright sleeve 27 in which there is located a rod 28 projecting above the sleeve and there carrying a laterally directed pin 29 over-riding the curved end 26 of the frame 25. The lower end of the rod 28 rests on a leaf spring 30 fast on the under side of the base 1 so as to have its front end free, this front end of the spring carrying a finger button 31 of sufficient length to extend above the upper surface of the frame or case 1 in position to be accessible to the operator. The rod 28 may have the ends engaging the spring 30 squared as indicated at 32 and passed through the spring through a correspondingly shaped hole so that the pin 29 will remain in proper relation to the frame 25 since the square extension 32 prevents the rod 28 from turning in the sleeve 27.

The embodiment of the invention shown in Figs. 1 to 4, so far as the construction of the parts is concerned is to be taken as to an extent illustrative since these parts as well as their relations as shown may be variously modified while still retaining the salient features of the invention.

Since the pointer 20 is in perpendicular relation to the scale beam 7, the pointer will be vertical when the scale beam is horizontal. The scale beam may move about its axis in either direction from the horizontal and so long as the range of movement is within comparatively narrow limits the movement of the scale beam under a constantly increasing force tending to move the scale beam about its axis will be directly proportional to such increase of force. Thus a weight placed in one of the pans 14 when the scale beam is in horizontal equilibrium, tending to move the scale beam about its axis a definite extent, say one hundredth of an inch may be doubled, and then the movement of the scale beam will be two one-hundredths of an inch, and so on. Theoretically there is a slight difference in the movement of the scale beam under the different weights applied, but so long as the movement of the scale beam is through a small arc the differences are so infinitesimal as to be entirely negligible even for the most critical weighing.

In accordance with the present invention one side of the scale beam is overweighted to a sufficient extent to cause the scale beam to move to an inclined position but still within the limit of movement where the addition of like weights to the scale beam will cause equal extent of movement to said scale beam. This rule holds true on the movement of the scale beam from the initial tipped position to the horizontal and to an equal movement beyond the horizontal corresponding to the original tipped position of the scale beam. Now by so proportioning the scale beam and the parts carried thereby that when the scale beam is in horizontal equilibrium, the addition of a weight equal to one-half of the unit weight or poise to be used with the scale will cause a tipping of the scale beam to an extent within the limit of practically equal movement under equal increment of weight, the range of movement of the indicating end of the pointer 20 may be divided off into an equal number of spaces equal to the number of sub-units in the basic unit with the scale extending to an extent on each side of the position of the pointer when the scale beam is in the horizontal position. The scale may therefore be accurately determined within practical limits and by making the pointer 20 comparatively long the spacing of the scale indications may be so wide as to permit sections of the sub-units being displayed on the scale and readily readable.

By this arrangement only weights or poises of the large unit size are necessary, and in scales of the character to which this invention particularly relates but very few weights are required within the capacity of the scales, all the smaller divisions being automatically indicated with great accuracy by the pointer 20.

The scale is further simplified by the sliding weight 19 which at one end of the rod 16 is inactive and when moved toward the other end of the rod becomes active, that is it acts as an adjustable augmenting and diminishing counterbalance for the overbalance, gradually lessening in activity as it approaches the axis or pivot of the scale beam and becomes more active when moved away therefrom, and this weight may represent the predetermined unit which on being moved along the rod 16 to any of the several positions in which it may be locked on said rod will operate as a unit weight or as multiples thereof. Under such an arrangement many quantities of materials may be accurately weighed without the necessity of any separate weights whatsoever.

Because of the great sensitiveness of scales of this character the indicator 20 is liable to swing for some time before coming to rest. To avoid this and to bring the scale beam to rest quickly the thumb button 31 may be pressed thus carrying the spring 30 away from the rod 28 and the pin 29 will then engage the frame end 26 with a degree of friction depending upon the weight of the rod 28, the spring 30 being strong enough to normally hold the rod 28 in the elevated position with the pin 29 out of engagement of the end 26 of the frame 25. The moving scale beam 7 is therefore brought to rest quickly by the damping effect of the pin 29 engaging the frame 25. By releasing the finger button 31 after the scale beam has come to rest it will quickly assume a state of equilibrium if the engagement of the pin 29 with the frame end 26 has caused the stopping of the scale beam before this point was reached.

In Fig. 5 the invention is shown applied to a pair of assayers' or like scales having pendent pans.

In the showing of Fig. 5 there is illustrated the usual base 33 provided with leveling screws 34 and carrying a post 35 at the top of which is a scale beam 36 of common pattern carrying pendent frames 37 at the ends each receiving a scale pan 38. The scale beam carries at its center a downwardly directed pointer 39, which however is threaded for a portion of its length as shown at 40 and this threaded portion carries threaded blocks 41 capable of being screwed along the threaded portion 40 of the pointer 39.

There is provided at the base of the column 35 a dial plate 42 over which the indicating end of the pointer 39 may travel.

By weighting one side of the scale beam so that it will come to rest in a position inclined to the horizontal at the angle 6 it would occupy if it were normally adjusted to be in equilibrium at the horizontal position and had in one pan a weight equal to half the predetermined unit, then the scale on the dial plate 42 will represent on each side of the central point equal fractional parts of the predetermined unit so that material placed upon the normally higher pan but weighing less than the predetermined unit will have its weight automatically indicated in fraction of the predetermined unit upon the dial plate 42 by the movement of the indicating end of the pointer 39 over such dial plate, the action being the same as in the scales shown in Figs. 1 to 4. In the particular indication of Fig. 5 it is assumed that the unit weight is a pennyweight and the dial plate 42 is divided up into 24 equal parts, there being twelve divisions on each side of the central point of the dial plate at which the pointer 39 comes to rest when the beam 36 is in horizontal position. Each division of the dial plate represents a grain.

In the particular structure shown in Fig. 5 the scale beam may be moved from a lower inactive position to an upper active position and for this purpose there is provided an arbor 43 mounted in the case 33 and provided with an accessible manipulating knob 44. The post 35 has extending therethrough a rod 45 constituting the direct support of the scale beam and this rod may be moved vertically through the post 35 by means of a link connection 46 with the arbor 43.

The weight 41 is designed for the accurate adjustment of the scale beam in the manner customary in scales of this character.

In the structure shown in Fig. 1 the arbor 6 has secured thereto so as to project downward therefrom and radially thereof, so that the terminals of the scale beam, and pointer with the stem 48, radiate therefrom at a 90° angle, a threaded stem 47 on which is mounted an adjustable weight 48 acting on the scales of Fig. 1 in the same manner as the weight 41 is employed with relation to the scales of Fig. 5.

In the structure of Figs. 1 to 4 longitudinal movement of the arbor 6 is prevented in one direction by a cover plate 49 carried by the post 3 and in the other by an adjustable head 50 carried by the casing 21 in line with the corresponding end of the arbor 6 or the knife edge carried by such end of the arbor.

The examples given in the drawings will be sufficient to show that the invention has a wide range of applicability and is not necessarily limited to any particular type of swinging scale. The invention is however particularly applicable to scales of precision designed for the accurate determination of the weights of small quantities of materials and such weights are very accurately indicated without the necessity of the operator handling any but the grosser weights employed and if the weight of the material is less than that of the predetermined unit, the scale is entirely automatic.

What is claimed is:—

1. In a weighing scale and in combination with the pivoted beam thereof, a segment rigidly secured to the beam, a weight adapted to be supported by the segment but held from movement therewith to bring the scale to rest, means for normally holding the weight out of contact with the segment, and manually controlled means for rendering said last mentioned means inoperative.

2. In a weighing scale and in combination with the pivoted beam thereof, a segment rigidly secured to the beam, a weight 28 having a projection 29 adapted to rest upon the segment, a guide 27 for said projection, a spring normally holding the weight out of contact with the segment, and a finger piece 31 for lowering the spring and permitting the weight to come in contact with the segment.

3. In a weighing scale, a centrally pivoted beam, scale pans supported on opposite ends thereof, weights 11 for holding the scale pans in substantially horizontal position, one of said weights being heavier than the other, a pendulum connected to the beam with its center of mass in a line substantially perpendicular to the beam and through its axis, a chart symmetrically placed with reference to a vertical line through the axis of the beam, and a hand rigidly secured to the beam perpendicular thereto and registering with one end of the chart when the scale is empty.

In testimony that I claim the foregoing as my own, I have hereto affixed my signature in the presence of two witnesses.

WILLIAM G. TEMPLETON.

Witnesses:
J. T. LAWSON,
C. E. PREINKERT.

Copies of this patent may be obtained for five cents each, by addressing the "Commissioner of Patents, Washington, D. C."